July 28, 1959
R. J. SCHAEFER
2,896,618
CORRUGATED DRESSING
Filed Jan. 21, 1958
2 Sheets-Sheet 1
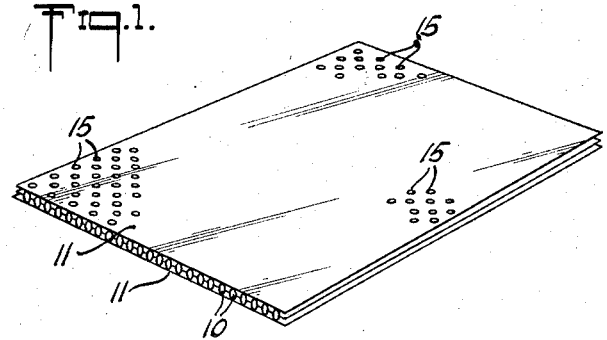
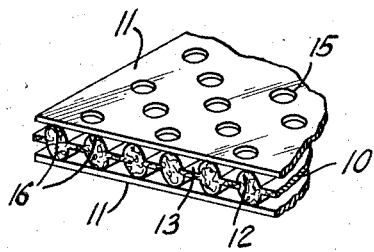
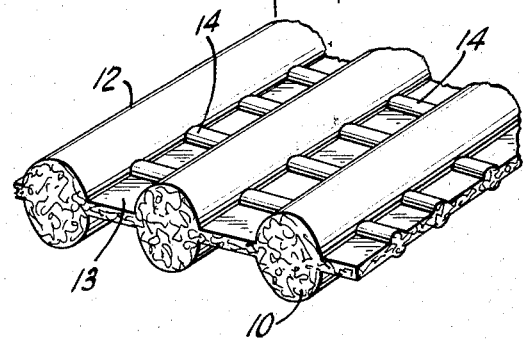
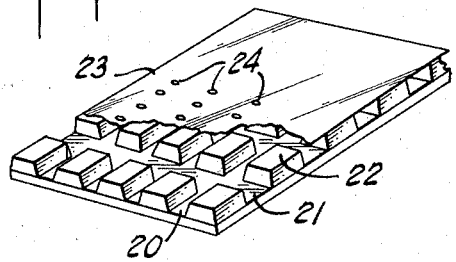
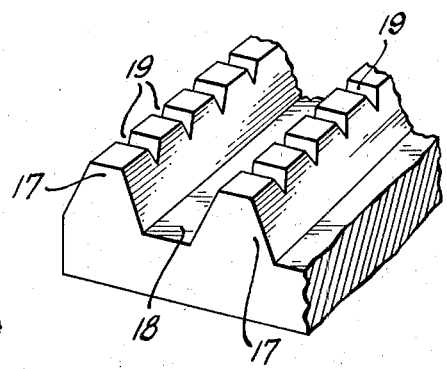
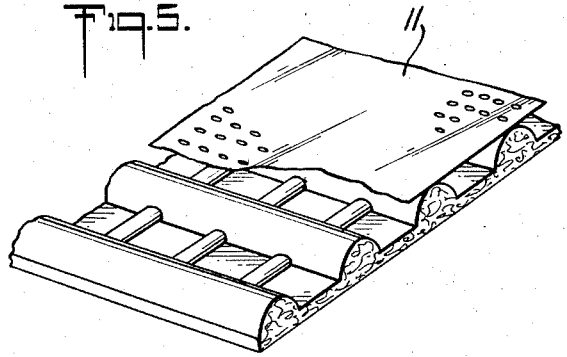
INVENTOR
ROBERT JOHN SCHAEFER
BY
Harold L. Warren
ATTORNEY July 28, 1959

R. J. SCHAEFER 2,896,618

CORRUGATED DRESSING

Filed Jan. 21, 1958

INVENTOR
ROBERT JOHN SCHAEFER

BY
ATTORNEY

United States Patent Office 2,896,618
Patented July 28, 1959

2,896,618

CORRUGATED DRESSING

Robert John Schaefer, Plainfield, N.J., assignor to Johnson & Johnson, a corporation of New Jersey Application January 21, 1958, Serial No. 710,245

19 Claims. (Cl. 128—156)

The present invention relates to surgical dressings and more particularly to dressings wherein the surface adapted to face the wound is formed of a perforated smooth flexible film.

It has generally been recognized that in the natural healing of animal wounds, the dressing serves primarily as a protection for the wound during the healing process. The problem with generally used dressings is that during the healing process the eschar tends to form or grow around parts of the dressing, thus making it difficult later to remove the dressing without tearing the eschar or scab and thus delaying the healing. In order to overcome this, it has heretofore been proposed to use a smooth, thin, flexible non-water soluble film in direct contact with the wound. The film, which may be made of any smooth flexible material, is perforated or cut to permit passage of fluids through the film to an absorbent backing. Dressings have been proposed wherein the flexible, non-water soluble, perforated film is bonded to or wrapped around an absorbent pad. Dressings of this type are described, for example, in the British patent to Gelinsky, 439,085, specification acceptance date November 28, 1935 and the French patent to Weber, 947,609, published July 7, 1949.

Although these film-faced dressings are a substantial improvement, insofar as preventing adherence of the dressing to the wound during the healing process, the size of the holes or perforations in the film must be quite small in order to prevent the eschar from adhering to the absorbent material in the immediate vicinity of the perforations. Also, there is a substantial tendency for the perforations to become plugged or corked, thus decreasing the effectiveness of the absorbent backing, this tendency being greater the smaller the perforations.

It is an object of the present invention to prepare film-faced dressings in which there is substantially less tendency for the eschar to adhere to the absorbent backing. It is a further object of the present invention to form perforated film-faced dressings having improved absorbent properties. A still further object is to form film-faced dressings in which the perforations can be larger while avoiding adherence to the absorbent backing, thus permitting more rapid and complete drainage from the wound.

It has now been discovered that the above-mentioned problems encountered with perforated film-faced dressings are substantially overcome and the above objects and advantages realized if the absorbent material backing the perforated film is embossed with a pattern providing a plurality of raised and depressed areas, the depressed areas being positioned below the perforations in the film. Although various patterns may be used in embossing the absorbent pad, a pattern found highly suitable is a series of ridges and depressions giving the absorbent a corrugated appearance. These ridges and depressions are so spaced with respect to the perforations in the film that at least a major portion of the depressions lies below the perforations in the assembled dressing.

An absorbent pad embossed with a series of substantially parallel ridges and depressions tends to be somewhat stiffer than is desirable for some wound applications. However, it has been further discovered that this stiffness can be substantially reduced by embossing cross corrugations of a somewhat smaller size in the depressed areas between the bosses or ridges of the major corrugations. Pads formed in this manner give excellent absorption and channeling of fluids passing through the perforations in the film and are substantially more flexible than pads having only the major corrugations running in one direction.

For a more detailed description, reference is made to the drawings in which:

Figure 1 is a perspective view of a dressing made in accordance with the present invention;

Figure 2 is an enlarged section of the dressing of Figure 1;

Figure 3 is an enlarged, detailed view of a section of the absorbent pad of Figure 1;

Figure 4 is a detailed view of a section of the embossing surface used in forming the pad of Figure 3;

Figure 5 is an enlarged sectional view of a dressing in which the pad is embossed only on one side, and a part of the facing film has been removed;

Figure 6 is a partial view of a dressing with a portion of the facing film removed employing an absorbent with a different embossed pattern;

Figure 7:
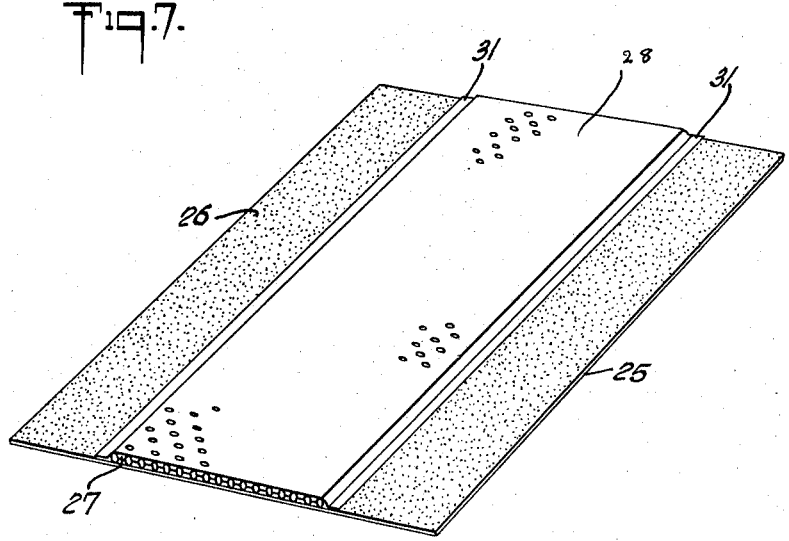
Figure 7 is a large adhesive type dressing in which the major ridges of the absorbent extend across the dressing.

Referring to the drawings, it will be noted that the dressing of Figure 1 comprises an absorbent corrugated pad 10 faced on both sides with a thin perforated flexible lubricous film 11. The absorbent pad, which is best illustrated in Figure 3, is provided with a series of major bosses or ridges 12 separated by depressed areas 13. In these depressed areas are provided a series of transverse smaller bosses 14 which extend between the major bosses 12. It is these smaller transverse bosses 14 which so markedly improve the flexibility of the corrugated pad.

The film 11, which may be any non-water soluble, thin, flexible, lubricous film suitable for non-adherent dressings, is provided with a plurality of perforations 15. In assembling the dressing, the film is bonded to the absorbent pad at 16 where the tops of the major ridges or bosses 12 contact the underside of the film 11. The embossed ridges 12 are so spaced with respect to the perforations 15 that the area of contact lies between the perforations as illustrated in Figures 1 and 2. Any non-water soluble adhesive may be used for bonding the lubricous film 11 to the absorbent 10. The adhesive should, however, preferably be one that will not tend to stiffen the dressing and which will maintain its bond even after steam sterilization. Organic solutions of terephthalate copolymer esters are found to be excellently suited for this purpose.

The absorbent pad may be embossed on both sides as shown in Figures 1 to 3 and faced on both sides with a perforated non-adhering film, thus permitting either side of the dressing to be used in contact with the wound, or the absorbent pad may be embossed only on one side as illustrated in Figure 5, with the perforated lubricous film 11, adapted to contact the wound surface, secured to the embossed side.

In forming the embossed absorbent pad, the raised portions to which the perforated facing film is secured are spaced at about 0.107 to 0.111 inch from each other and have a height of about 0.020 to 0.030 inch, depending upon material thickness.

The minor bosses 14, to obtain the greatest flexibility, are spaced about 0.060 to 0.064 inch from each other and are generally not more than about 0.015 to 0.020 inch in height.

In Figure 6, a dressing having an absorbent with a different embossed pattern is illustrated. In this modification, the absorbent pad is provided with intersecting valleys 20 and 21 to provide a plurality of intermittent hills 22 which contact the lubricous, perforated film 23. The perforations 24 in the film are so spaced with respect to the embossed pattern that they come above the valleys 20 and 21 so as to permit maximum drainage from a wound. Although absorbent pads embossed with this particular pattern are not as flexible as those embossed as illustrated in Figure 3, the dressings provide better drainage of wound excretions and have less tendency to adhere to wound surfaces than perforated film dressings in which the film is in continuous contact with the absorbent facing.

Figure 8:
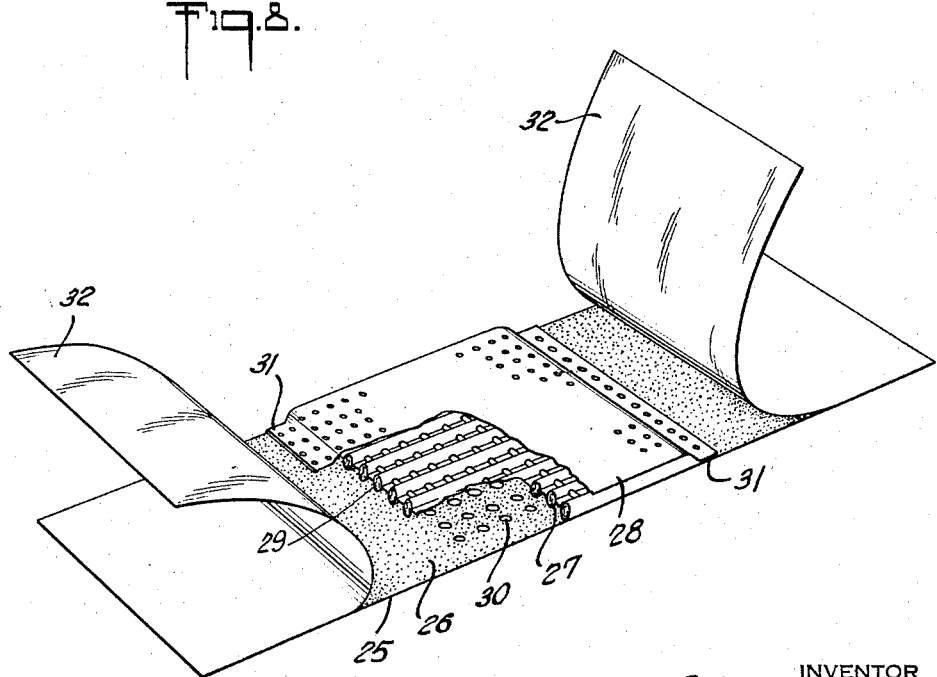
Figure 8 is an adhesive bandage type dressing in which a portion of the facing film and absorbent pad have been removed.

The embodiments shown in Figures 7 and 8 are dressings of the adhesive bandage type where 25 is an adhesive-coated backing strip, either of fabric or plastic coated with an adhesive 26. Secured to the strip 25 is a pad 27 of absorbent material covered by a thin, lubricous, perforated film 28. The pad is embossed in the manner illustrated in Figure 3. In the bandage of Figure 7, which uses a relatively large dressing, the major corrugations extend across the backing strip, whereas in the dressing of Figure 8 the major corrugations extend longitudinally of the backing strip. Although either structure is suitable, the main advantage of the latter is that the edge of the film 28 can be made to coincide with the end ridges of the dressing so as to give a neater looking product and seal the ends of the valleys in the absorbent to prevent the entrance of foreign matter.

The adhesive-coated backing strip 25 has perforations 30 in the area under the pad, as shown in Figure 8, to permit breathing of the dressing and evaporation from the absorbent 27.

In the particular embodiments illustrated in Figures 7 and 8, the film 28 extends beyond the pad area and is bonded to the adhesive-coated backing as at 31. When it is desired to completely cover the absorbent pad 27, the film 28 can be made sufficiently large to extend over all edges of the pad. Where the pad is of the same width as the adhesive-coated backing, the extending edge of the film, corresponding to the edge of the backing, is folded around and under the pad and bonded to the adhesive of the backing. Where the absorbent pad 27 is narrower than the backing 25, the extending edge of the film can be bonded in the same manner as at 31. The adhesive 26 of the backing is protected by protective strips 32 which are removed prior to application of the bandage.

The absorbent pad may be made of any suitable absorbent material, such as absorbent surgical cotton in the form of sheets of crepe tissue or in the form of woven or non-woven fabrics. It is preferred that the absorbent material contain a bonding agent which will hold the fibers in the embossed pattern after the absorbent has been embossed. This is highly desirable, otherwise the pad will tend to assume its original form after the fibers become wet while in use. If a thermoplastic absorbent such as Vinyon (an acetone soluble copolymer of vinyl chloride and vinyl acetate) is used instead of cotton or other non-thermoplastic fiber, the bonding agent may be dispensed with since the thermoplastic material will be self-bonding when heated embossing rolls are used. It is generally preferred, however, to use cotton fibers which have been treated with a suitable bonding agent. Some examples of suitable bonding materials are polyvinyl acetate or a few Vinyon fibers mixed in with the cotton.

In the preferred manner of forming the embossed absorbent pad, a layer of absorbent containing a small amount of a heat bonding cement is passed between heated embossing rolls. In order to obtain a pad of the type illustrated in Figure 3, the surface of each roll is provided with a series of parallel ridges 17 separated by valleys 18. The top of each ridge is marked by a series of grooves 19 extending across the ridge. These grooves are substantially shallower than the valleys 18. The valleys 18 in the embossing roll form the major bosses 12 in the absorbent pad, whereas the shallower transverse grooves 19 form the minor bosses 14.

It is apparent that if a pad embossed on both sides is desired, two embossing rolls must be used. If it is desired to emboss the pad only on one side as illustrated by the absorbent pads of Figures 5 and 6, then only one embossing roll is used in association with a roll having a smooth surface.

The following example, which is given for purposes of illustration only, will help to further describe the invention:

An absorbent embossed pad is prepared from a non-woven fabric formed of carded fibers bonded lightly with a small amount of polyvinyl acetate. The non-woven fabric is impregnated with a heat-sensitive binder by immersing in a ½ to 10% suspension of polyvinyl acetate and then drying. The fabric is then passed between a pair of heated embossing rolls having an embossing surface as illustrated in Figure 4. The surface temperature of the rolls is about 200° C. The ridges on the embossing roll have a height of $\frac{1}{16}$ inch and are spaced $\frac{7}{64}$ inch apart. The grooves on the top of the ridges are spaced $\frac{1}{16}$ inch from each other and have a depth of 0.018 inch.

A polyethylene terephthalate film ¼ mil in thickness is provided with staggered perforations $\frac{1}{16}$ inch in diameter, spaced $\frac{7}{64}$ inch apart. These perforations, although staggered with respect to each other, are in straight lines spaced about ⅛ inch apart. One surface of the perforated polyethylene terephthalate film is then treated with a thin thermoplastic coating of a solvent base adhesive of terephthalic acid copoly ester. The adhesive-coated film is bonded to the corrugated absorbent pad, care being taken to have the tops of the bosses fall between the lines of perforations.

A pad thus formed has a substantially higher degree of flexibility than pads having other embossed designs providing raised and depressed areas. Also, the dressings are substantially more absorbent and less adherent than dressings made of the same absorbent faced with the same type of perforated film where the faced surface of absorbent is continuous and not spaced from the film under the perforations.

In the preferred practice of the present invention, polyethylene terephthalate films, such as sold under the trademark "Mylar" by E. I. du Pont de Nemours and Company, are used because of their flexibility, resistance to high temperatures, such as used in steam sterilization, their strength, and their somewhat lower cost as compared to other suitable film materials. However, any film may be used as long as it is sufficiently flexible, insoluble in water, substantially inert to the wound excretions and sufficiently thin to readily adapt itself to the surface conformity of a wound. Other film materials that have been successfully used are films made of high pressure polyethylene, low pressure polyethylene, irradiated polyethylene, polyvinyl chloride, plain parchment paper, cellulose acetate, polyvinylidene chloride and nylon.

The film should be quite thin, film thicknesses of less than 0.001 inch generally being preferred. There is no limit to film thinness except strength.

The perforations in the film should be present in sufficient number to permit ready passage of excretions from the wound surface into the absorbent backing. It is generally preferred that these perforations have an open area equivalent to a circle having a diameter of 0.01 to 0.2 inch and be present in sufficient number and so dispersed as to provide, for each square inch of film surface, an open area of at least 0.0075 square inch, the open area generally varying within the range of 0.1 to 0.4 square inch per square inch of film.

The perforations are preferably placed in rows so that the area between the holes can be readily aligned with the major bosses in the absorbent pad when cemented thereto. Although the best results are obtained when all of the perforations in the film are located above depressed areas in the absorbent, many of the advantages of the present invention are still obtained even though some of the perforations fall directly over the raised portion of the absorbent to which the film is bonded as long as the majority of perforations fall over the depressed areas.

Although various modifications of the invention have been described in order to illustrate the same, the invention is not limited to these specific modifications which are given for the purpose of illustration only and is to be limited only in accordance wtih the appended claims.

Having thus described my invention, I claim:

1. A dressing comprising an absorbent pad having at least one surface embossed into a plurality of raised and depressed areas and a flexible water insoluble perforated film covering said surface, the depressions in said pad being under the perforations in said film.

2. A dressing comprising an absorbent pad having at least one surface bonded in an embossed state into a plurality of raised and depressed areas and a flexible water insoluble perforated film covering said surface, the depressions in said pad being under the perforations in said film.

3. A dressing comprising an absorbent pad having at least one embossed surface containing a plurality of bosses, a flexible water insoluble perforated film covering the embossed face of said pad and bonded to said pad at the point of contact of said bosses with said film.

4. A dressing comprising an absorbent pad having at least one embossed surface containing a plurality of raised substantially parallel ridges, a flexible water insoluble perforated film bonded to said embossed surface at the point of contact between said film and said ridges, the perforations in said film being arranged in parallel lines and falling between the bonded areas of said film.

5. A dressing comprising an absorbent pad having at least one embossed surface containing a plurality of raised substantially parallel ridges, a flexible water insoluble perforated film bonded to said embossed surface at the point of contact between said film and said ridges, the perforations in said film having an open area equal to a circle having a diameter of 0.01 to 0.2 inch and being sufficient in number to provide an open area in said film of not appreciably less than 0.01 inch for each square inch of film surface, the major portion of said perforations being positioned between said bonded areas.

6. A dressing comprising an absorbent pad having at least one embossed surface containing a plurality of substantially parallel ridges with flat areas in between broken by a plurality of smaller transverse ridges, a flexible water insoluble perforated film bonded to said embossed surface at the point of contact between said film and said first-mentioned ridges, said film being so positioned with respect to said pad that the perforations in said film fall between said first-mentioned larger ridges.

7. A dressing comprising an absorbent pad having at least one embossed surface containing a plurality of substantially parallel ridges with flat areas in between broken by a plurality of smaller transverse ridges, a flexible water insoluble perforated film bonded to said embossed surface at the point of contact between said film and said first-mentioned ridges, said film being so positioned with respect to said pad that the perforations in said film fall between said first-mentioned larger ridges, said pad being bonded in said embossed state with a water insoluble cement.

8. A dressing comprising an absorbent pad having at least one embossed surface containing a plurality of substantially parallel ridges spaced about 0.107 to 0.111 inch from each other with flat areas in between broken by a plurality of smaller transverse ridges spaced about 0.060 to 0.064 inch from each other, a flexible water insoluble perforated film bonded to said embossed surface at the point of contact between said film and said first-mentioned ridges, said film being so positioned with respect to said pad that the perforations in said film fall between said first-mentioned larger ridges.

9. A dressing comprising an absorbent pad having embossed on both sides a plurality of substantially parallel raised ridges, flexible water insoluble perforated film bonded to both sides of said pad, said film being bonded to said pad at the points of contact between said film and said raised ridges, and said film being positioned with respect to said pad so that at least the major portion of the perforations in said film falls between said ridges.

10. A dressing comprising an absorbent pad having embossed on both sides a plurality of substantially parallel ridges with flat areas between broken by a plurality of smaller transverse ridges, said pad being bonded in said embossed state with a water insoluble cement, flexible water insoluble perforated film bonded to both sides of said pad, said film being bonded to said pad at the point of contact between said film and said first-mentioned ridges, said film being so positioned with respect to said pad that the perforations in said film fall between said first-mentioned ridges.

11. An adhesive dressing comprising an adhesive-coated base of flexible material, an embossed absorbent pad smaller than said base supported on the adhesive-coated side thereof, said pad being covered with a perforated, flexible, water insoluble film.

12. An adhesive dressing comprising an adhesive-coated base of flexible material, an embossed absorbent pad containing a plurality of raised substantially parallel ridges and smaller than said base supported on the adhesive-coated side thereof, said pad being covered with a perforated, flexible, water insoluble film.

13. An adhesive dressing comprising an adhesive-coated base of flexible material, an embossed absorbent pad smaller than said base supported on the adhesive-coated side thereof, said pad being covered with a perforated, flexible, water insoluble film, said embossed pad containing a plurality of raised substantially parallel ridges separated by flat areas broken by a plurality of smaller transverse ridges and said perforated film being so positioned with respect to said embossed pad that the perforations in said film fall between said first-mentioned substantially parallel ridges.

14. An adhesive dressing comprising an adhesive-coated base of flexible material, an embossed absorbent pad smaller than said base supported on the adhesive-coated side thereof, said pad being covered with a perforated, flexible, water insoluble film, said embossed pad containing a plurality of raised substantially parallel ridges separated by flat areas broken by a plurality of smaller transverse ridges and said perforated film being so positioned with respect to said embossed pad that the perforations in said film fall between said first-mentioned substantially parallel ridges, said film being larger than said absorbent pad and having its edges, which extend beyond the edges of said pad, bonded to said base by the adhesive coating thereon.

15. An adhesive dressing comprising an adhesive-coated base of flexible material, an absorbent pad supported on said adhesive-coated side of said base, said pad having at least one embossed surface containing a plurality of major ridges spaced about 0.107 to 0.111 inch from each other and having between a plurality of smaller transverse ridges spaced about 0.060 to 0.064 inch from each other, a flexible water-insoluble perforated lubricous film covering the surface of said pad not resting on said adhesive-coated base and bonded in relation to said embossed pad so that at least the majority of said perforations in said film fall between major ridges.

16. An adhesive dressing comprising an adhesive-coated base of flexible material, an absorbent pad supported on said adhesive-coated side of said base, said pad having at lest one embossed surface containing a plurality of major ridges spaced about 0.107 to 0.111 inch from each other and having between a plurality of smaller transverse ridges spaced about 0.060 to 0.064 inch from each other, a flexible water insoluble perforated lubricous film covering the surface of said pad not resting on said adhesive-coated base and bonded in relation to said embossed pad so that at least the majority of said perforations in said film fall between said major ridges, the perforations in said film being in lines and said film being bonded to said major ridges between said lines of perforations.

17. An absorbent pad having at least one embossed surface containing a plurality of parallel ridges with substantially flat areas between, said flat areas being broken by smaller transverse ridges, the fibers of said pad being bonded in said embossed pattern with a water-insoluble cement.

18. An absorbent pad having at least one embossed surface containing a plurality of parallel ridges spaced about 0.107 to 0.111 inch from each other with substantially flat areas between, said flat areas being broken by smaller transverse ridges spaced about 0.060 to 0.064 inch from each other, the fibers of said pad being bonded in said embossed pattern with a water-insoluble cement.

19. An absorbent pad having at least one embossed surface containing a plurality of parallel ridges spaced about 0.107 to 0.111 inch from each other with substantially flat areas between, said flat areas being broken by smaller transverse ridges spaced about 0.060 to 0.064 inch from each other, the fibers of said pad being bonded in said embossed pattern with a water-insoluble cement, said larger ridges having a height of about 0.020 to 0.030 inch and the smaller transverse ridges having a height of about 0.015 to 0.020 inch.

References Cited in the file of this patent

FOREIGN PATENTS

| | | |
|---|---|---|
| 776,408 | Great Britain | June 5, 1957 |
| 778,813 | Great Britain | July 10, 1957 |